United States Patent
Yoshioka et al.

(10) Patent No.: US 6,262,655 B1
(45) Date of Patent: Jul. 17, 2001

(54) EMERGENCY REPORTING SYSTEM AND TERMINAL APPARATUS THEREIN

(75) Inventors: Kenji Yoshioka; Yukio Ichikawa; Arata Kurosawa, all of Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/512,215

(22) Filed: Feb. 24, 2000

(30) Foreign Application Priority Data

Mar. 29, 1999 (JP) ................................... 11-086785
May 21, 1999 (JP) ................................... 11-142391

(51) Int. Cl.$^7$ ................................................ B60Q 1/00
(52) U.S. Cl. ............... 340/425.5; 340/426; 340/990; 340/539; 379/404; 379/442; 379/564
(58) Field of Search ................... 340/425.5, 426, 340/990, 539; 379/404, 442, 564

(56) References Cited

U.S. PATENT DOCUMENTS

| 5,388,147 | * | 2/1995 | Grimes | ................. | 379/59 |
| 5,555,286 | * | 9/1996 | Tendler | ................. | 379/59 |
| 5,630,209 | * | 5/1997 | Wizgall et al. | ................. | 455/66 |
| 5,742,666 | * | 4/1998 | Alpert | ................. | 379/58 |

FOREIGN PATENT DOCUMENTS

| 9163028 | 6/1997 | (JP). |
| 10262126 | 9/1998 | (JP). |
| 10333899 | 12/1998 | (JP). |

* cited by examiner

Primary Examiner—Jeffery Hofsass
Assistant Examiner—Tai T. Nguyen
(74) Attorney, Agent, or Firm—Louis Woo

(57) ABSTRACT

An emergency reporting apparatus for a vehicle includes a memory storing information representing a telephone number of an emergency report receiving center. Connection with the emergency report receiving center is implemented in response to the telephone number represented by the information in the memory. An emergency can be reported to the emergency report receiving center. The information in the memory can be updated to change the telephone number represented thereby.

8 Claims, 11 Drawing Sheets

EMERGENCY REPORTING SYSTEM AND TERMINAL APPARATUS THEREIN

BACKGROUND OF THE INVENTION

1. Field of the Invention

This invention relates to an emergency reporting network system for vehicles such as automotive vehicles. This invention also relates to a terminal apparatus used in an emergency reporting network system.

2. Description of the Related Art

A conventional emergency communication apparatus for a vehicle is started when an emergency occurs in the vehicle. After the start, the conventional apparatus tries to connect with an emergency report receiving center (for example, a police station or a fire station) via a mobile telephone network. The conventional apparatus includes a memory. In a factory, fixed data representing the telephone number of the emergency report receiving center are written into the memory before the shipment of the conventional apparatus. In the event of an emergency, the fixed data are read out from the memory, and a call signal or a dial signal to connect with the emergency report receiving center is generated in response to the telephone number represented by the fixed data. It is difficult to update or rewrite the fixed data in the memory after the shipment of the conventional apparatus.

SUMMARY OF THE INVENTION

It is a first object of this invention to provide an improved emergency reporting network system.

It is a second object of this invention to provide an improved terminal apparatus in an emergency reporting network system.

A first aspect of this invention provides an emergency reporting apparatus for a vehicle. The emergency reporting apparatus comprises a memory storing information representing a telephone number of an emergency report receiving center; means for implementing connection with the emergency report receiving center in response to the telephone number represented by the information in the memory, and for reporting an emergency to the emergency report receiving center; and means for updating the information in the memory to change the telephone number represented thereby.

A second aspect of this invention is based on the first aspect thereof, and provides an emergency reporting apparatus wherein the information in the memory represents a registration number, and the updating means comprises means for updating the information in the memory to change the registration number represented thereby.

A third aspect of this invention is based on the first aspect thereof, and provides an emergency reporting apparatus wherein the information in the memory which is updatable by the updating means represents at least one of a telephone number of the emergency report receiving center exclusively for an emergency report, a telephone number of the emergency report receiving center exclusively for speech communication, a telephone number of the emergency report receiving center exclusively for a performance test, a registration number of the emergency reporting apparatus, a registration number of the vehicle, and an identification number of a user.

A fourth aspect of this invention is based on the first aspect thereof, and provides an emergency reporting apparatus wherein the updating means comprises an interface, an external device connected to the interface, and means connected between the memory and the interface for updating the information in response to operation of the external device.

A fifth aspect of this invention is based on the first aspect thereof, and provides an emergency reporting apparatus further comprising an external device for generating a confirmation requirement signal, and means for transmitting the information from the memory to the external device in response to the confirmation requirement signal generated by the external device.

A sixth aspect of this invention is based on the fifth aspect thereof, and provides an emergency reporting apparatus wherein the information transmitted from the memory to the external device represents at least one of a telephone number of the emergency report receiving center exclusively for an emergency report, a telephone number of the emergency report receiving center exclusively for speech communication, a telephone number of the emergency report receiving center exclusively for a performance test, a registration number of the emergency reporting apparatus, a registration number of the vehicle, and an identification number of a user.

A seventh aspect of this invention is based on the fifth aspect thereof, and provides an emergency reporting apparatus wherein the information transmitted from the memory to the external device represents the time of the occurrence of an emergency report, and a history of an emergency reporting process.

An eighth aspect of this invention provides an emergency reporting network system comprising an emergency report receiving center; a communication network; and emergency reporting apparatuses connectable with the emergency report receiving center via the communication network; wherein each of the emergency reporting apparatuses comprises the emergency reporting apparatus of one of the first to seventh aspects of this invention.

A ninth aspect of this invention provides an emergency reporting apparatus for a vehicle. The emergency reporting apparatus comprises a detachable external memory device storing data related to an emergency report; first means for reading out the data from the detachable external memory device; and second means for reporting an emergency to an emergency report receiving center in response to the data read out by the first means.

A tenth aspect of this invention is based on the ninth aspect thereof, and provides an emergency reporting apparatus further comprising third means for, in cases where the first means fails to read out the data from the detachable external memory device, informing a user of the failure.

An eleventh aspect of this invention is based on the ninth aspect thereof, and provides an emergency reporting apparatus further comprising third means for recording information of a history of an emergency report and a history of an abnormality of an emergency report on the detachable external memory device.

A twelfth aspect of this invention is based on the ninth aspect thereof, and provides an emergency reporting apparatus further comprising third means for detecting an abnormality, and fourth means for, when the third means detects an abnormality, recording information of the abnormality detected by the third means on the detachable external memory device.

A thirteenth aspect of this invention is based on the ninth aspect thereof, and provides an emergency reporting apparatus further comprising a main battery, an auxiliary battery, third means for detecting whether or not a voltage of the main battery drops below a reference level, fourth means for replacing the main battery with the auxiliary battery when the third means detects that the voltage of the main battery drops below the reference level, and fifth means for recording information of replacement of the main battery with the auxiliary battery on the detachable external memory device.

A fourteenth aspect of this invention is based on the ninth aspect thereof, and provides an emergency reporting apparatus further comprising third means for, in cases where the first means fails to read out the data from the detachable external memory device, generating substitute data, and fourth means for reporting an emergency to the emergency report receiving center in response to the substitute data generated by the third means.

A fifteenth aspect of this invention is based on the ninth aspect thereof, and provides an emergency reporting apparatus further comprising third means for transmitting the data, which is read out from the detachable external memory device by the first means, to the emergency report receiving center when the second means reports an emergency to the emergency report receiving center.

A sixteenth aspect of this invention is based on the ninth aspect thereof, and provides an emergency reporting apparatus further comprising third means for transmitting the data, which is read out from the detachable external memory device by the first means, to the emergency report receiving center when the second means reports an emergency to the emergency report receiving center, wherein the data transmitted to the emergency report receiving center by the third means contains information related to a vehicle passenger.

A seventeenth aspect of this invention is based on the ninth aspect thereof, and provides an emergency reporting apparatus further comprising a sensor for sensing a fingerprint and generating data representing the sensed fingerprint, and third means for transmitting the data of the fingerprint, which is generated by the sensor, to the emergency report receiving center when the second means reports an emergency to the emergency report receiving center.

An eighteenth aspect of this invention provides an emergency reporting network system comprising an emergency report receiving center; a communication network; and emergency reporting apparatuses connectable with the emergency report receiving center via the communication network; wherein each of the emergency reporting apparatuses comprises the emergency reporting apparatus of one of the ninth to seventeenth aspects of this invention.

A nineteenth aspect of this invention provides an emergency reporting network system comprising an emergency report receiving center; a communication network; and emergency reporting apparatuses connectable with the emergency report receiving center via the communication network; wherein each of the emergency reporting apparatuses comprises first means for transmitting an information piece concerning a user to the emergency report receiving center; wherein the emergency report receiving center comprises a storage unit storing data representing a list of information pieces concerning respective legitimate customers, second means for deciding whether or not the information piece transmitted from the emergency reporting apparatus agrees with one of the information pieces in the list, third means for providing an emergency report accepting service to the emergency reporting apparatus when the second means decides that the information piece transmitted from the emergency reporting apparatus agrees with one of the information pieces in the list, and fourth means for refusing to provide an emergency report accepting service to the emergency reporting apparatus when the second means decides that the information piece transmitted from the emergency reporting apparatus agrees with none of the information pieces in the list; and wherein the information piece concerning the user represents at least one of a fingerprint of the user and an identification number of the user.

DESCRIPTION OF THE PREFERRED EMBODIMENTS

First Embodiment

An emergency reporting network system includes emergency reporting apparatuses which are mounted on vehicles (for example, automotive vehicles) respectively. The emergency reporting apparatuses are terminal apparatuses. The emergency reporting network system also includes an emergency report receiving center which operates as a host apparatus. The emergency report receiving center is, for example, a police station or a fire station. The emergency reporting apparatuses can be connected with the host apparatus (the emergency report receiving center) via a mobile telephone network.

Figure 1:
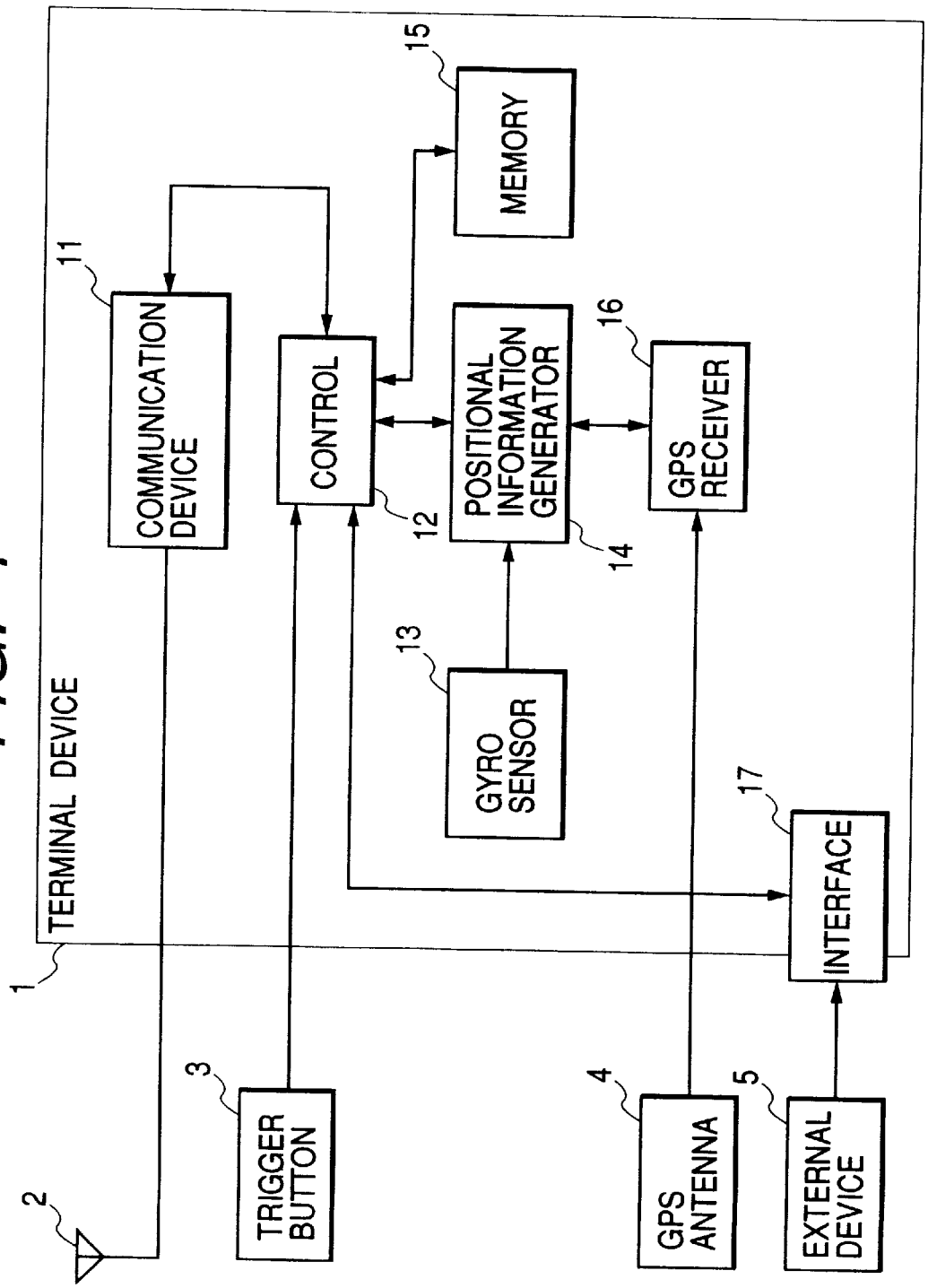
FIG. 1 is a block diagram of an emergency reporting apparatus according to a first embodiment of this invention.

FIG. 1 shows an emergency reporting apparatus (a terminal apparatus) according to a first embodiment of this invention. The emergency reporting apparatus is mounted on a vehicle such as an automotive vehicle.

As shown in FIG. 1, the emergency reporting apparatus includes a terminal device 1, a communication antenna 2, a trigger button 3, a GPS (Global Positioning System) antenna 4, and an external device 5. The terminal device 1 is connected to the communication antenna 2, the trigger button 3, the GPS antenna 4, and the external device 5.

The terminal device 1 includes a communication device 11, a controller 12, a gyro sensor 13, a positional information generator 14, a memory 15, a GPS receiver 16, and an interface 17. The communication device 11 is connected to the communication antenna 2 and the controller 12. The controller 12 is connected to the trigger button 3, the positional information generator 14, the memory 15, and the interface 17. The gyro sensor 13 is connected to the positional information generator 14. The GPS receiver 16 is connected to the GPS antenna 4 and the positional information generator 14. The external device 5 can be connected with and disconnected from the interface 17.

The trigger button 3 includes a manually-operated button which can be accessed by a user, that is, a driver or an occupant of the related vehicle. When the trigger button 3 is depressed, a trigger signal is transmitted from the trigger button 3 to the controller 12 as an emergency-occurrence indicating signal.

The GPS antenna 4 can receive GPS signals from GPS satellites. The GPS antenna 4 feeds the received GPS signals to the GPS receiver 16.

The communication device 11 includes a telephone set such as a mobile telephone set having a radio communication device which can be controlled by the controller 12. The communication device 11 can output and feed a radio signal to the communication antenna 2. The radio signal is radiated by the communication antenna 2. The radiated radio signal can propagate to a base station of a related radio telephone network. The communication antenna 2 can receive a radio signal from the base station. The received radio signal is fed from the communication antenna 2 to the communication device 11. In this way, the communication device 11 can communicate with the base station by radio on a two-way basis.

The communication device 11 can receive a call requirement signal and a destination-telephone-number signal from the controller 12. Upon the reception of the call requirement signal, the communication device 11 generates a radio signal to call the communication opposite party designated by the destination telephone number. The communication opposite party is, for example, an emergency report receiving center (a police station or a fire station). The radio call signal contains a dial signal. The radio call signal is fed from the communication device 11 to the communication antenna 2 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 2 receives the radio answer signal. The received radio answer signal is fed from the communication antenna 2 to the communication device 11. The communication device 11 recognizes from the radio answer signal that a connection with the communication opposite party is established. Then, the communication device 11 changes to a data communication mode of operation or a speech communication mode of operation. In addition, the communication device 11 informs the controller 12 that the connection with the communication opposite party is established.

The communication device 11 can receive, from the controller 12, positional information data representing the position of the related vehicle, the direction of travel of the related vehicle, and the orientation of the related vehicle. During the data communication mode of operation, the communication device 11 transmits the positional information data to the communication opposite party via the base station. As previously mentioned, the communication opposite party is, for example, an emergency report receiving center (a police station or a fire station). During the speech communication mode of operation, the communication device 11 allows two-way speech communication between a user (a driver or an occupant of the related vehicle) and an operator of the communication opposite party via the base station.

The controller 12 includes a microcomputer, a CPU, or a similar device having a combination of an input/output port, a signal processing section, a RAM, and a ROM. The controller 12 operates in accordance with a program stored in the ROM.

The gyro sensor 13 generates data representing the direction of travel of the related vehicle and the orientation of the related vehicle. The gyro sensor 13 outputs the generated data to the positional information generator 14. The GPS receiver 16 generates data representative of the position of the related vehicle in response to the GPS signals fed from the GPS antenna 4. The GPS receiver 16 outputs the generated data to the positional information generator 14. The positional information generator 14 produces positional information data in response to the output data from the gyro sensor 13 and the output data from the GPS receiver 16. The produced positional information data represent the position of the related vehicle, the direction of travel of the related vehicle, and the orientation of the related vehicle. The positional information generator 14 can output the produced positional information data to the controller 12.

The memory 15 stores information representing the telephone number of an emergency report receiving center (a police station or a fire station), the registration number of the related vehicle, and the registration number (for example, the identification number) of the user. The memory 15 can be accessed by the controller 12. The positional information data and present time data are periodically written into the memory 15 by the controller 12 so that data representing a history of the position of the related vehicle are accumulated in the memory 15.

The external device 5 can be connected with the interface 17. The external device 5 can be operated by, for example, a user. The external device 5 can generate a change requirement signal when being operated. In the case where the external device 5 is connected with the interface 17, the change requirement signal is transmitted from the external device 5 to the controller 12 via the interface 17. Information (new-contents information) representing the telephone number of a new emergency report receiving center can be inputted into the external device 5. Also, information (new-contents information) representing the registration number of a new user or a new registration number of the user can be inputted into the external device 5. Furthermore, information (new-contents information) representing a new registration number of the related vehicle can be inputted into the external device 5. In the case where the external device 5 is connected with the interface 17, the new-contents information is transmitted from the external device 5 to the controller 12 via the interface 17.

The memory 15 is accessed by the controller 12 in response to the change requirement signal. Then, the new-contents information is written into the memory 15 by the controller 12 on an updating or rewriting basis. For example, in the memory 15, the information representing the telephone number of the old emergency report receiving center is replaced by the information representing the telephone number of the new emergency report receiving center. Similarly, the information representing the registration number of the old user can be replaced by the information representing the registration number of the new user. In addition, the information representing the old registration number of the user can be replaced by the information representing the new registration number of the user. Furthermore, the information representing the old registration number of the vehicle can be replaced by the information representing the new registration number of the vehicle.

The external device 5 can generate a confirmation requirement signal when being operated. In the case where the external device 5 is connected with the interface 17, the confirmation requirement signal is transmitted from the external device 5 to the controller 12 via the interface 17.

The memory 15 is accessed by the controller 12 in response to the confirmation requirement signal. Specifically, the information representing the telephone number of the emergency report receiving center, the registration number of the related vehicle, and the registration number of the user is read out from the memory 15 by the controller 12. Then, the read-out information is transmitted from the controller 12 to the external device 5 via the interface 17. The external device 5 notifies the user of the telephone number of the emergency report receiving center, the registration number of the related vehicle, and the registration number of the user which are represented by the transmitted information. The external device 5 includes, for example, a display for indicating the contents of the transmitted information. In this way, the user can confirm the telephone number of the emergency report receiving center, the registration number of the related vehicle, and the registration number of the user which are represented by the information currently stored in the memory 15.

The emergency reporting apparatus in FIG. 1 operates as follows. The positional information generator 14 produces positional information data in response to the output data from the gyro sensor 13 and the output data from the GPS receiver 16. The controller 12 periodically receives the positional information data from the positional information generator 14, and periodically writes the positional information data into the memory 15 together with the present time data. Accordingly, data representing a history of the position of the related vehicle are accumulated in the memory 15.

In the event of an emergency such as an accident or a sudden illness, the trigger button 3 can be depressed by a user (a driver or an occupant of the related vehicle). The depression of the trigger button 3 sends an emergency-occurrence indicating signal to the controller 12. The controller 12 recognizes from the emergency-occurrence indicating signal that an emergency occurs and the emergency should be reported. Then, the controller 12 starts a process of reporting an emergency.

During the emergency reporting process, the controller 12 reads out the positional information data (the positional history data) and the information of the telephone number of the emergency report receiving center from the memory 15. In addition, the controller 12 generates emergency-occurrence time data, that is, data representing the moment or time of the occurrence of the emergency. The controller 12 informs the communication device 11 of the telephone number of the emergency report receiving center. In addition, the controller 12 requires the communication device 11 to generate a radio signal in response to the telephone number to call the emergency report receiving center. Accordingly, the communication device 11 generates the radio call signal directed to the emergency report receiving center. The radio call signal contains a dial signal. The radio call signal is fed from the communication device 11 to the communication antenna 2 before being radiated thereby. The radio call signal propagates to a base station. The corresponding call signal is transmitted via the base station to the emergency report receiving center. Normally, an answer signal responsive to the call signal is transmitted from the emergency report receiving center to the base station. The corresponding radio answer signal is transmitted from the base station. The communication antenna 2 receives the radio answer signal. The received radio answer signal is fed from the communication antenna 2 to the communication device 11. The communication device 11 recognizes from the radio answer signal that connection with the emergency report receiving center is established. Then, the communication device 11 changes to the data communication mode of operation. In addition, the communication device 11 informs the controller 12 that the connection with the emergency report receiving center is established. Thus, the controller 12 decides that the connection with the emergency report receiving center has been successfully established.

Subsequently, the controller 12 operates to implement data communication. Specifically, the controller 12 feeds the positional information data (the positional history data) and the emergency-occurrence time data to the communication device 11. The controller 12 requires the communication device 11 to generate a radio signal containing the positional information data and the emergency-occurrence time data. Accordingly, the communication device 11 generates the radio data signal. The radio data signal is fed from the communication device 11 to the communication antenna 2 before being radiated thereby. The radio data signal propagates to the base station. The corresponding data signal is transmitted via the base station to the emergency report receiving center. In this way, the positional information data and the emergency-occurrence time data are transmitted to the emergency report receiving center on a data communication basis. After the data communication has been completed, the controller 12 operates to allow two-way speech communication between the user and an operator of the emergency report receiving center.

In the case where the center's telephone number, the user's registration number, or the vehicle's registration number represented by the information in the memory 15 is required to be changed, the user connects the external device 5 with the interface 17 and then operates the external device 5 to generate a change requirement signal. The change requirement signal is transmitted from the external device 5 to the controller 12 via the interface 17. Subsequently, the user operates the external device 5 to input information (new-contents information) representing a new center's telephone number, a new user's registration number, or a new vehicle's registration number. The new-contents information is transmitted from the external device 5 to the controller 12 via the interface 17. The controller 12 accesses the memory 15 in response to the change requirement signal. Then, the controller 12 writes the new-contents information into the memory 15 on an updating or rewriting basis. Thus, the information in the memory 15 which represents the center's telephone number, the user's registration number, or the vehicle's registration number is updated or rewritten as follows. According to a first example, the information representing the old center's telephone number is replaced by the information representing the new center's telephone number. According to a second example, the information representing the old user's registration number is replaced by the information representing the new user's registration number. According to a third example, the information representing the old vehicle's registration number is replaced by the information representing the new vehicle's registration number.

In the case where the center's telephone number, the user's registration number, and the vehicle's registration number represented by the information in the memory 15 is required to be confirmed, the user connects the external device 5 with the interface 17 and then operates the external device 5 to generate a confirmation requirement signal. The confirmation requirement signal is transmitted from the external device 5 to the controller 12 via the interface 17. The controller accesses the memory 15 in response to the confirmation requirement signal. Specifically, the controller 12 reads out the information representing the center's telephone number, the user's registration number, and the vehicle's registration number from the memory 15. Then, the controller 12 transmits the read-out information to the external device 5 via the interface 17. The external device 5 notifies the user of the center's telephone number, the user's registration number, and the vehicle's registration number which are represented by the transmitted information. In this way, the user can confirm the center's telephone number, the user's registration number, and the vehicle's registration number which are represented by the information currently stored in the memory 15.

Figure 2:
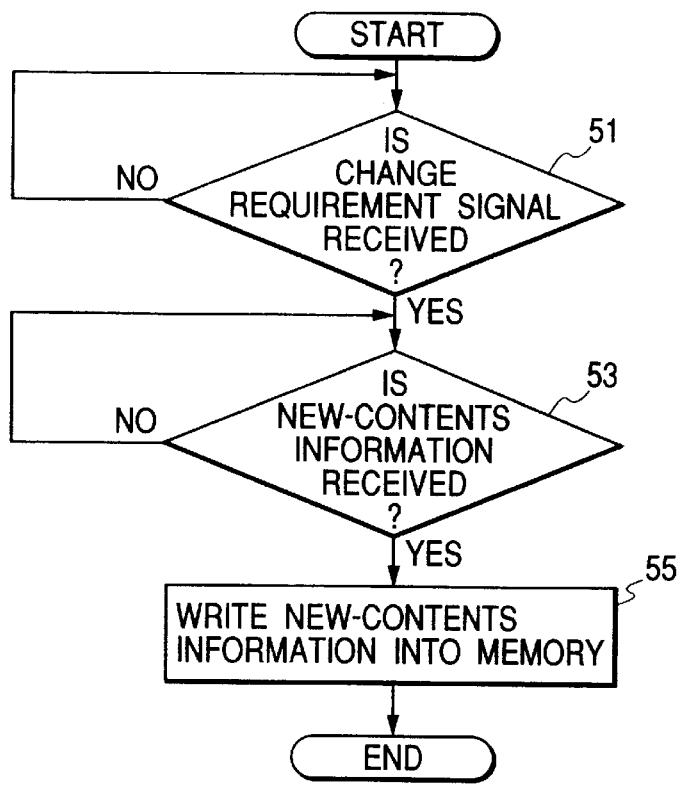
FIG. 2 is a flowchart of a first segment of a program for a controller in FIG. 1.

FIG. 2 is a flowchart of a first segment of the program for the controller 12. As shown in FIG. 2, a first step 51 of the program segment decides whether or not a change requirement signal is received. When a change requirement signal is not received, the step 51 is repeated. On the other hand, when a change requirement signal is received, the program advances from the step 51 to a step 53.

The step 53 decides whether or not new-contents information is received. The new-contents information represents a new center's telephone number, a new user's registration number, or a new vehicle's registration number. When new-contents information is not received, the step 53 is repeated. On the other hand, when new-contents information is received, the program advances from the step 53 to a step 55.

The step 55 accesses the memory 15. Then, the controller 12 writes the new-contents information into the memory 15 on an updating or rewriting basis. Thus, the information in the memory 15 which represents the center's telephone number, the user's registration number, or the vehicle's registration number is updated or rewritten as follows. According to a first example, the information representing the old center's telephone number is replaced by the information representing the new center's telephone number. According to a second example, the information representing the old user's registration number is replaced by the information representing the new user's registration number. According to a third example, the information representing the old vehicle's registration number is replaced by the information representing the new vehicle's registration number. After the step 55, the current execution cycle of the program segment ends.

Figure 3:
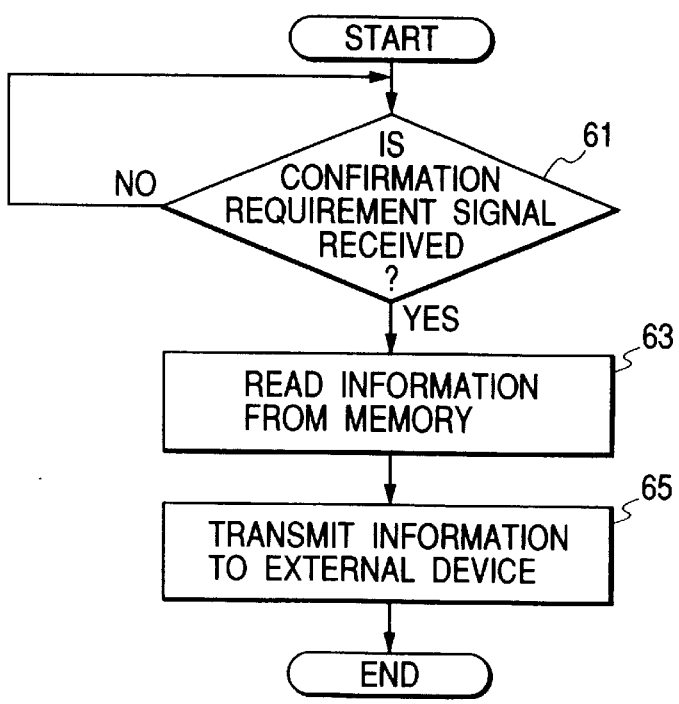
FIG. 3 is a flowchart of a second segment of the program for the controller in FIG. 1.

FIG. 3 is a flowchart of a second segment of the program for the controller 12. As shown in FIG. 3, a first step 61 of the program segment decides whether or not a confirmation requirement signal is received. When a confirmation requirement signal is not received, the step 61 is repeated. On the other hand, when a confirmation requirement signal is received, the program advances from the step 61 to a step 63.

The step 63 reads out the information representing the center's telephone number, the user's registration number, and the vehicle's registration number from the memory 15.

A step 65 following the step 63 transmits the read-out information to the external device 5 via the interface 17. The read-out information represents the center's telephone number, the user's registration number, and the vehicle's registration number. After the step 65, the current execution cycle of the program segment ends.

The memory 15 may store additional information representing at least one of a telephone number of the emergency report receiving center exclusively for speech communication, a telephone number of the emergency report receiving center exclusively for a performance test, the registration number of the emergency reporting apparatus (the registration number of the terminal apparatus), and the registration number of the emergency reporting network system. The contents of the additional information in the memory 15 can be updated or rewritten in a way similar to the previously-mentioned way. The additional information can be transmitted from the memory 15 to the external device 5 in a way similar to the previously-mentioned way for confirming purposes.

The positional history data (the positional information data) and the emergency-occurrence time data may be transmitted to the external device 5 via the interface 17.

Second Embodiment

An emergency reporting network system includes emergency reporting apparatuses which are mounted on vehicles (for example, automotive vehicles) respectively. The emergency reporting apparatuses are terminal apparatuses. The emergency reporting network system also includes an emergency report receiving center which operates as a host apparatus. The emergency report receiving center is, for example, a police station or a fire station. The emergency reporting apparatuses can be connected with the host apparatus (the emergency report receiving center) via a mobile telephone network.

Figure 4:
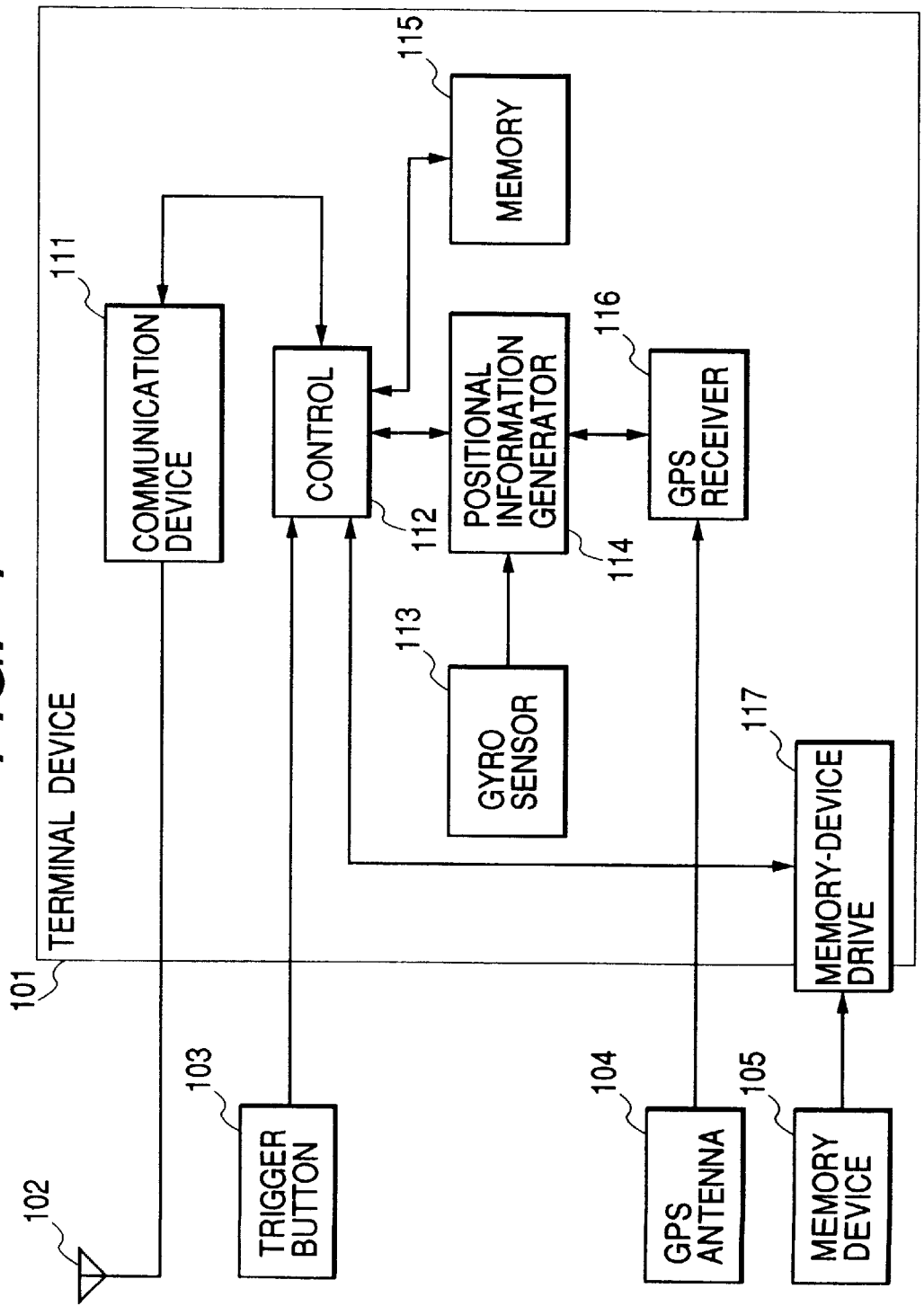
FIG. 4 is a block diagram of an emergency reporting apparatus according to a second embodiment of this invention.

FIG. 4 shows an emergency reporting apparatus (a terminal apparatus) according to a second embodiment of this invention. The emergency reporting apparatus is mounted on a vehicle such as an automotive vehicle.

As shown in FIG. 4, the emergency reporting apparatus includes a terminal device 101, a communication antenna 102, a trigger button 103, a GPS (Global Positioning System) antenna 104, and an external memory device 105. The external memory device 105 includes a recording medium such as an IC card. The terminal device 101 is connected to the communication antenna 102, the trigger button 103, the GPS antenna 104, and the external memory device 105.

The terminal device 101 includes a communication device 111, a controller 1 12, a gyro sensor 113, a positional information generator 114, a memory 115, a GPS receiver 116, and a memory-device drive 117. The communication device 111 is connected to the communication antenna 102 and the controller 112. The controller 112 is connected to the trigger button 103, the positional information generator 114, the memory 115, and the memory-device drive 117. The gyro sensor 113 is connected to the positional information generator 114. The GPS receiver 116 is connected to the GPS antenna 104 and the positional information generator 114. The external memory device 105 is detachably or disconnectably connected with the memory-device drive 117. Thus, the external memory device 105 is a detachable memory device.

The trigger button 103 includes a manually-operated button which can be accessed by a user, that is, a driver or an occupant of the related vehicle. When the trigger button 103 is depressed, a trigger signal is transmitted from the trigger button 103 to the controller 112 as an emergency-occurrence indicating signal.

The GPS antenna 104 can receive GPS signals from GPS satellites. The GPS antenna 104 feeds the received GPS signals to the GPS receiver 116.

The communication device 111 includes a telephone set such as a mobile telephone set having a radio communication device which can be controlled by the controller 112. The communication device 111 can output and feed a radio signal to the communication antenna 102. The radio signal is radiated by the communication antenna 102. The radiated radio signal can propagate to a base station of a related radio telephone network. The communication antenna 102 can receive a radio signal from the base station. The received radio signal is fed from the communication antenna 102 to the communication device 111. In this way, the communication device 111 can communicate with the base station by radio on a two-way basis.

The communication device 111 can receive a call requirement signal and a destination-telephone-number signal from the controller 112. Upon the reception of the call requirement signal, the communication device 111 generates a radio signal to call the communication opposite party designated by the destination telephone number. The communication opposite party is, for example, an emergency report receiving center (a police station or a fire station). The radio call signal contains a dial signal. The radio call signal is fed from the communication device 111 to the communication antenna 102 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 102 receives the radio answer signal. The received radio answer signal is fed from the communication antenna 102 to the communication device 111. The communication device 111 recognizes from the radio answer signal that connection with the communication opposite party is established. Then, the communication device 111 changes to a data communication mode of operation or a speech communication mode of operation. In addition, the communication device 111 informs the controller 112 that the connection with the communication opposite party is established.

The communication device 111 can receive, from the controller 112, positional information data representing the position of the related vehicle, the direction of travel of the related vehicle, and the orientation of the related vehicle. During the data communication mode of operation, the communication device 111 transmits the positional information data to the communication opposite party via the base station. As previously mentioned, the communication opposite party is, for example, an emergency report receiving center (a police station or a fire station). During the speech communication mode of operation, the communication device 111 allows two-way speech communication between a user (a driver or an occupant of the related vehicle) and an operator of the communication opposite party via the base station.

The controller 112 includes a microcomputer, a CPU, or a similar device having a combination of an input/output port, a signal processing section, a RAM, and a ROM. The controller 112 operates in accordance with a program stored in the ROM.

The gyro sensor 113 generates data representing the direction of travel of the related vehicle and the orientation of the related vehicle. The gyro sensor 113 outputs the generated data to the positional information generator 114. The GPS receiver 116 generates data representative of the position of the related vehicle in response to the GPS signals fed from the GPS antenna 104. The GPS receiver 116 outputs the generated data to the positional information generator 114. The positional information generator 114 produces positional information data in response to the output data from the gyro sensor 113 and the output data from the GPS receiver 116. The produced positional information data represent the position of the related vehicle, the direction of travel of the related vehicle, and the orientation of the related vehicle. The positional information generator 114 can output the produced positional information data to the controller 112.

The memory 115 can be accessed by the controller 112. The positional information data and present time data are periodically written into the memory 115 by the controller 112 so that data representing a history of the position of the related vehicle are accumulated in the memory 115. In addition, the memory 115 may store information representing the telephone number of an emergency report receiving center (a police station or a fire station), the registration number of the related vehicle, the registration number (for example, the identification number) of the user, and the registration number of the emergency reporting network system.

The external memory device 105 stores information representing the telephone number of an emergency report receiving center (a police station or a fire station), the registration number of the related vehicle, the registration number (for example, the identification number) of the user, and the registration number of the emergency reporting network system. The external memory device 105 further stores information related to a vehicle passenger or a vehicle occupant. The memory-device drive 117 reads out the information from the external memory device 105 when being actuated by the controller 112. The read-out information is transmitted from the memory-device drive 117 to the controller 112. The read-out information may be stored into the memory 115 by the controller 112. The memory-device drive 117 acts as an interface for the external memory device 105.

As previously mentioned, the external memory device 105 is detachably connected with the memory-device drive 117. Replacing the external memory device 105 with a new one can change the telephone number of the emergency report receiving center, the registration number of the related vehicle, the registration number of the user, and the registration number of the emergency reporting network system which are represented by information therein.

The emergency reporting apparatus in FIG. 4 operates as follows. The positional information generator 114 produces positional information data in response to the output data from the gyro sensor 113 and the output data from the GPS receiver 116. The controller 112 periodically receives the positional information data from the positional information generator 114, and periodically writes the positional information data into the memory 115 together with the present time data. Accordingly, data representing a history of the position of the related vehicle are accumulated in the memory 115.

In the event of an emergency such as an accident or a sudden illness, the trigger button 103 can be depressed by a user (a driver or an occupant of the related vehicle). The depression of the trigger button 103 sends an emergency-occurrence indicating signal to the controller 112. The controller 112 recognizes from the emergency-occurrence indicating signal that an emergency occurs and the emergency should be reported. Then, the controller 112 starts a process of reporting an emergency.

During the emergency reporting process, the controller 112 reads out the positional information data (the positional history data) from the memory 115. In addition, the controller 112 actuates the memory-device drive 117 so that the information representing the telephone number of the emergency report receiving center, the registration number of the related vehicle, the registration number of the user, and the registration number of the emergency reporting network system, and also the information related to the vehicle passenger or the vehicle occupant will be read out from the external memory device 105. Then, the memory-device drive 117 transmits the read-out information to the controller 112. Subsequently, the controller 112 informs the communication device 111 of the telephone number of the emergency report receiving center. In addition, the controller 112 requires the communication device 111 to generate a radio signal in response to the telephone number to call the emergency report receiving center. Accordingly, the communication device 11 generates the radio call signal directed to the emergency report receiving center. The radio call signal contains a dial signal. The radio call signal is fed from the communication device 111 to the communication antenna 102 before being radiated thereby. The radio call signal propagates to a base station. The corresponding call signal is transmitted via the base station to the emergency report receiving center. Normally, an answer signal responsive to the call signal is transmitted from the emergency report receiving center to the base station. The corresponding radio answer signal is transmitted from the base station. The communication antenna 102 receives the radio answer signal. The received radio answer signal is fed from the communication antenna 102 to the communication device 111. The communication device 111 recognizes from the radio answer signal that connection with the emergency report receiving center is established. Then, the communication device 111 changes to the data communication mode of operation. In addition, the communication device 111 informs the controller 112 that the connection with the emergency report receiving center is established. Thus, the controller 112 decides that the connection with the emergency report receiving center has been successfully established.

Subsequently, the controller 112 operates to implement data communication. Specifically, the controller 112 feeds the positional information data (the positional history data) to the communication device 111. Also, the controller 112 feeds at least part of the information, which has been read out from the external memory device 105, to the communication device 111 as additional information data. The controller 112 requires the communication device 111 to generate a radio signal containing the positional information data and the additional information data. Accordingly, the communication device 111 generates the radio data signal. The radio data signal is fed from the communication device 111 to the communication antenna 102 before being radiated thereby. The radio data signal propagates to the base station. The corresponding data signal is transmitted via the base station to the emergency report receiving center. In this way, the positional information data and the additional information data are transmitted to the emergency report receiving center on a data communication basis. After the data communication has been completed, the controller 112 operates to allow two-way speech communication between the user and an operator of the emergency report receiving center.

In the case where the information which will be transmitted from the external memory device 105 to the controller 112 is required to be changed, the user replaces the external memory device 105 with a new one. Specifically, the user disconnects the external memory device 105 from the memory-device drive 117, and then connects the new one with the memory-device drive 117.

The controller 112 may actuate the memory-device drive 117 and access the memory 115 to transmit the information from the external memory device 105 to the memory 115 immediately after a power supply of the emergency reporting apparatus is turned on. In this case, during the emergency reporting process, the controller 112 reads out the information representative of the telephone number of the emergency report receiving center from the memory 115, and then informs the communication device 111 of the telephone number of the emergency report receiving center.

Figure 5:
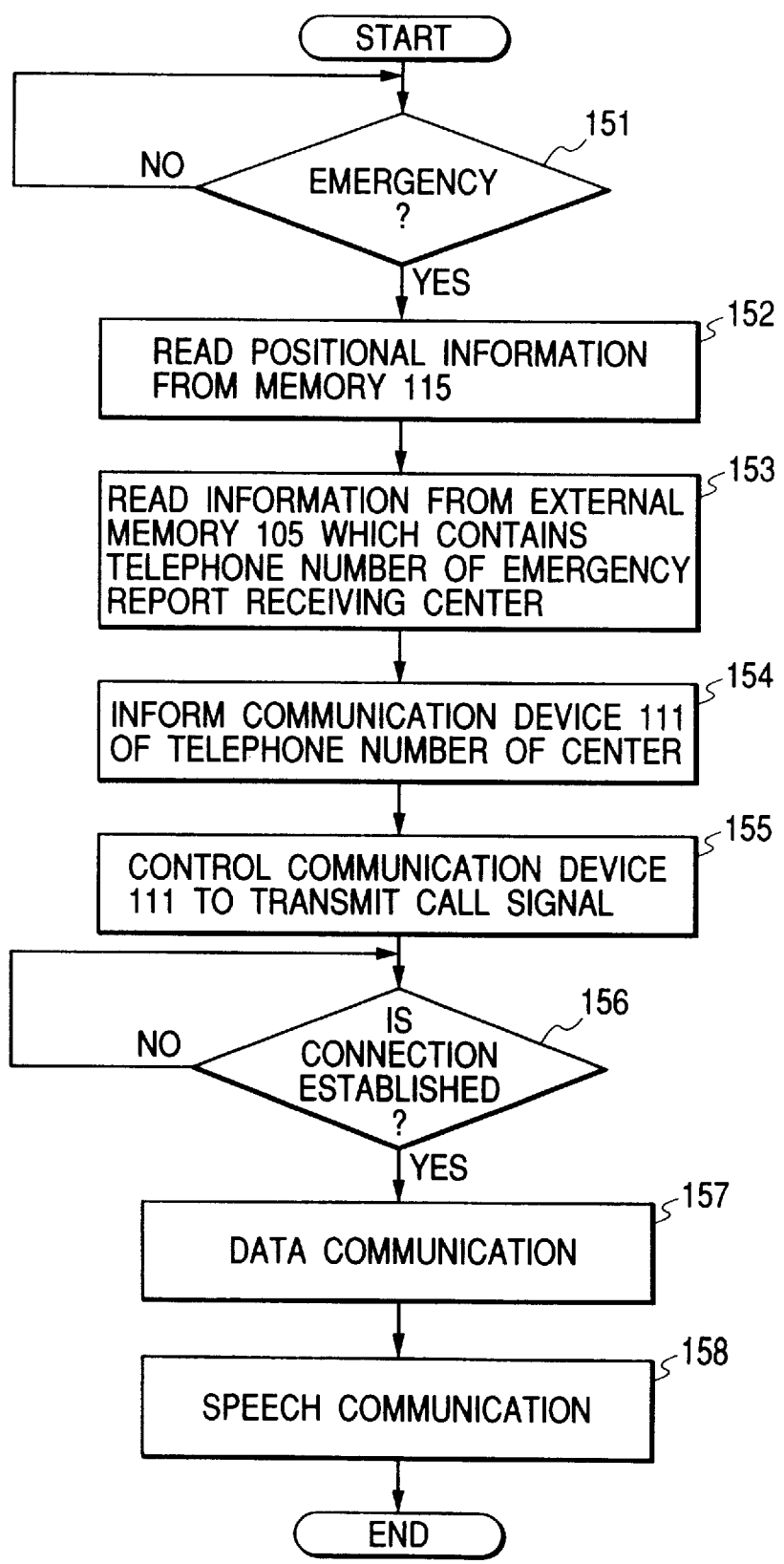
FIG. 5 is a flowchart of a segment of a program for a controller in FIG. 4.

FIG. 5 is a flowchart of a segment of the program for the controller 112. As shown in FIG. 5, a first step 151 of the program segment decides whether or not an emergency-occurrence indicating signal is received. When an emergency-occurrence indicating signal is not received, the step 151 is repeated. On the other hand, when an emergency-occurrence indicating signal is received, the program advances from the step 151 to a step 152.

The step 152 reads out the positional information data (the positional history data) from the memory 115.

A step 153 following the step 152 actuates the memory-device drive 117 to read, from the external memory device 105, the information representing the telephone number of the emergency report receiving center, the registration number of the related vehicle, the registration number of the user, and the registration number of the emergency reporting network system, and also the information related to the vehicle passenger or the vehicle occupant. The step 153 controls the memory-device drive 117, and thereby receives the read-out information therefrom.

A step 154 subsequent to the step 153 informs the communication device 111 of the telephone number of the emergency report receiving center.

A step 155 following the step 154 controls the communication device 111 to generate a radio signal to call the emergency report receiving center. Accordingly, the communication device 111 generates the radio call signal directed to the emergency report receiving center. As previously mentioned, the radio call signal is transmitted from the communication device 111 to a base station. Then, the corresponding call signal is transmitted via the base station to the emergency report receiving center. After the step 155, the program advances to a step 156.

The step 156 decides whether or not connection with the communication opposite party has been established by referring to information fed from the communication device 111.

The connection-related information is generated by the communication device 111 on the basis of an answer signal which is transmitted from the emergency report receiving center in response to the call signal. When connection with the emergency report receiving center has not yet been established, the step 156 is repeated. On the other hand, when connection with the emergency report receiving center has been established, the program advances from the step 156 to a step 157.

The step 157 implements data communication. Specifically, the step 157 feeds the positional information data (the positional history data) to the communication device 111. In addition, the step 157 feeds at least part of the information, which has been read out from the external memory device 105, to the communication device 111 as additional information data. The step 157 controls the communication device 11 to transmit the positional information data and the additional information data to the emergency report receiving center.

A step 158 following the step 157 controls the communication device 111 to allow two-way speech communication between the user (the driver or the occupant of the related vehicle) and the operator of the emergency report receiving center. After the step 158, the current execution cycle of the program segment ends.

The external memory device 105 includes a magnetic recording medium, a magnetic recording credit card, an IC-based recording medium, an IC card, a memory card with a PCMCIA interface, a flash memory, an EP-ROM, an EEP-ROM, a ferroelectric memory, a magnetic recording disc, a floppy diskette, or a DVD post-cut area.

The external memory device 105 may store additional information representing at least one of a telephone number of the emergency report receiving center exclusively for speech communication, a telephone number of the emergency report receiving center exclusively for testing the performance of the terminal device 101, numbers designated by the emergency reporting network system, the registration number of a user's driving license, and the registration number of a user's insurance card. The additional information can be transmitted from the external memory device 105 to the controller 112 in a way similar to the previously-mentioned way.

Third Embodiment

Figure 6:
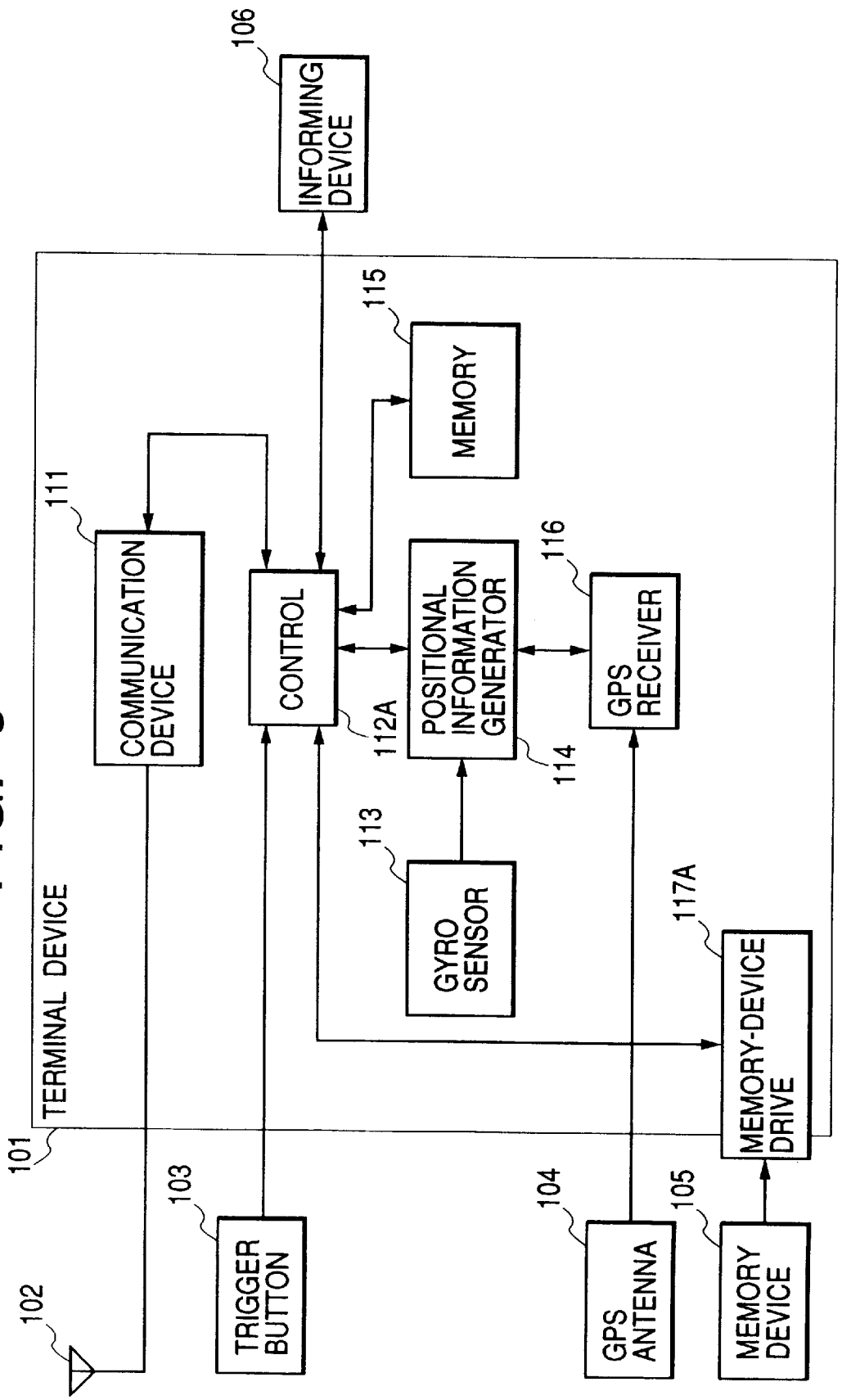
FIG. 6 is a block diagram of an emergency reporting apparatus according to a third embodiment of this invention.

FIG. 6 shows an emergency reporting apparatus (a terminal apparatus) according to a third embodiment of this invention. The emergency reporting apparatus in FIG. 6 is similar to that in FIG. 4 except for design changes mentioned hereinafter. The emergency reporting apparatus in FIG. 6 includes a controller 112A and a memory-device drive 117A which replace the controller 112 and the memory-device drive 117 (see FIG. 4) respectively. The emergency reporting apparatus in FIG. 6 further includes an informing device 106 connected to the controller 112A. The informing device 106 includes a liquid crystal display, a display device, a voice reproducing device, a loudspeaker, a buzzer, or a sound generating device.

The controller 112A can receive, from a suitable device (not shown), a signal representing that a user enters a related vehicle. Examples of such a signal are a signal representing that a vehicle accessory power supply is turned on, and a signal representing that a vehicle ignition power supply is turned on. The controller 112A can detect a given condition of the related vehicle in which the vehicle is drivable. An example of such a condition is disengagement of a vehicle parking brake.

In the case where the controller 112A receives a signal representing that the user enters the related vehicle or in the case where the controller 112A detects that the related vehicle falls into the drivable condition, the controller 112A actuates the memory-device drive 117A to read out information from an external memory device 105. In addition, the controller 112A controls the memory-device drive 117A, and thereby receives the read-out information therefrom.

When the memory-device drive 117A fails to read out the information from the external memory device 105 or when the memory-device drive 117A detects that an abnormal condition occurs, the memory-device drive 117A outputs an abnormality-occurrence indicating signal to the controller 112A. An example of the abnormal condition is a failure to access the external memory device 105. One of causes of the failure to read out the information from the external memory device 105 is that the external memory device 105 is disconnected from the memory-device drive 117A.

In response to the abnormality-occurrence indicating signal, the controller 112A decides that the external memory device 105 is wrong. Then, the controller 112A outputs a control signal to the informing device 106 to visually or audibly notify the user of the abnormality. In the case where the abnormality is caused by disconnection of the external memory device 105 from the memory-device drive 117A, the notification of the abnormality urges the user to connect the external memory device 105 with the memory-device drive 117A.

Fourth Embodiment

Figure 7:
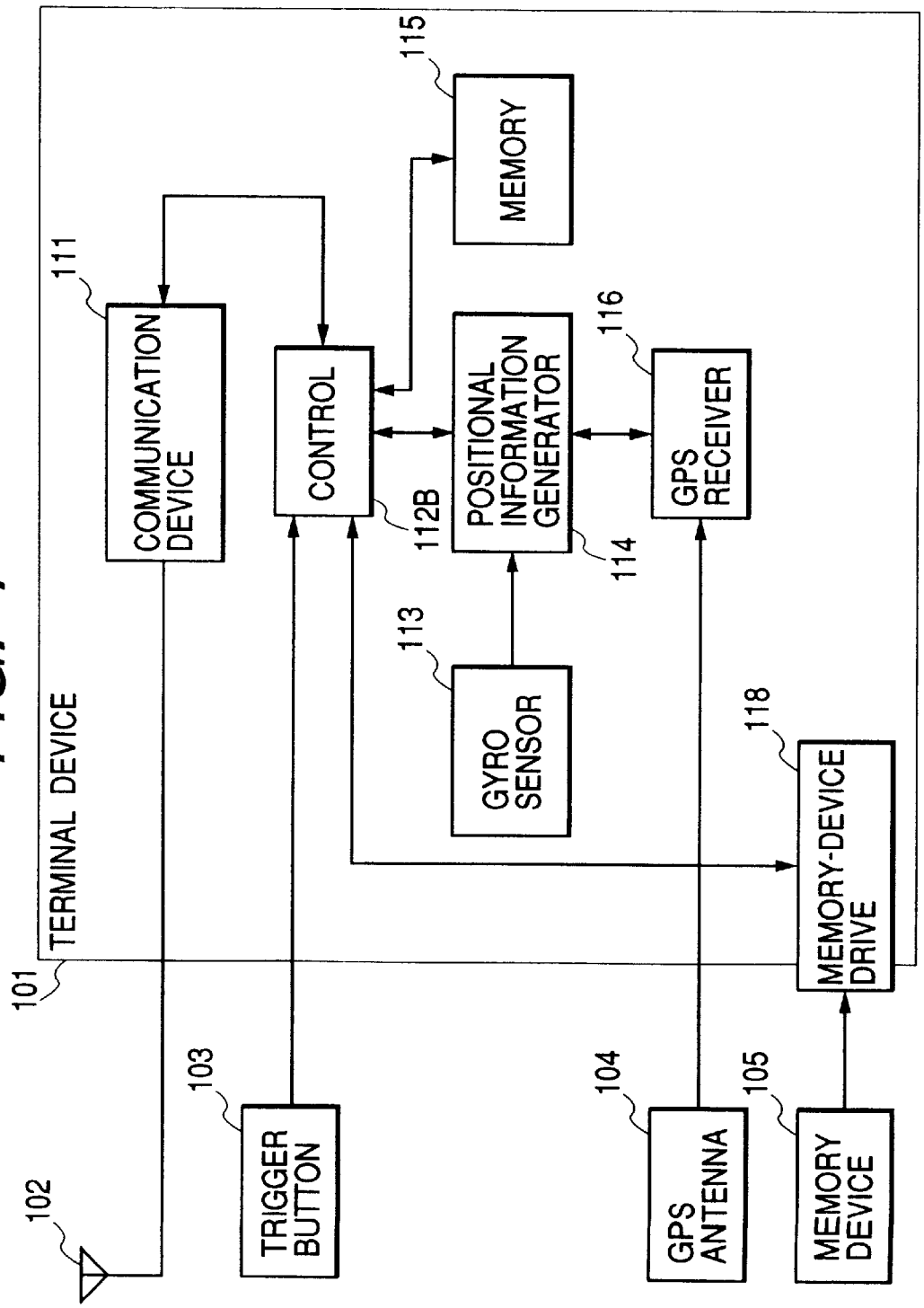
FIG. 7 is a block diagram of an emergency reporting apparatus according to a fourth embodiment of this invention.

FIG. 7 shows an emergency reporting apparatus (a terminal apparatus) according to a fourth embodiment of this invention. The emergency reporting apparatus in FIG. 7 is similar to that in FIG. 4 except for design changes mentioned hereinafter. The emergency reporting apparatus in FIG. 7 includes a controller 112B and a memory-device drive 118 which replace the controller 112 and the memory-device drive 117 (see FIG. 4) respectively.

The memory-device drive 118 is actuated by the controller 112B, recording information of a general communication history and a communication abnormality history on an external memory device 105. Both the memory-device drives 117 and 118 may be provided to implement writing and reading information into and from the external memory device 105.

The controller 112B operates to write emergency-report-related history information into the external memory device 105 as follows. The controller 112B outputs a write command signal to the memory-device drive 118. In addition, the controller 112B feeds the memory-device drive 118 with information to be written into the external memory device 105. The memory-device drive 118 writes the information into the external memory device 105 in response to the write command signal. The information to be written into the external memory device 105 contains data representing an emergency-report history, data transmitted to an emergency report receiving center, data representing the date and time of an emergency report, data representing a condition of starting an emergency report (data representing whether or not an emergency report is started by manual operation of a trigger button 103), and positional information data.

In the case where an emergency reporting process fails to be normally executed, the controller 112B actuates the memory-device drive 118 to write given information into the external memory device 105. The given information contains data representing the failure of the emergency reporting process, and data representing a cause of the failure. Examples of the cause are an excessively low strength of a radio signal coming from a base station, a failure to connect with an emergency report receiving center, a failure of data communication, a failure of change from data communication to speech communication, and a failure of speech communication.

Fifth Embodiment

Figure 8:
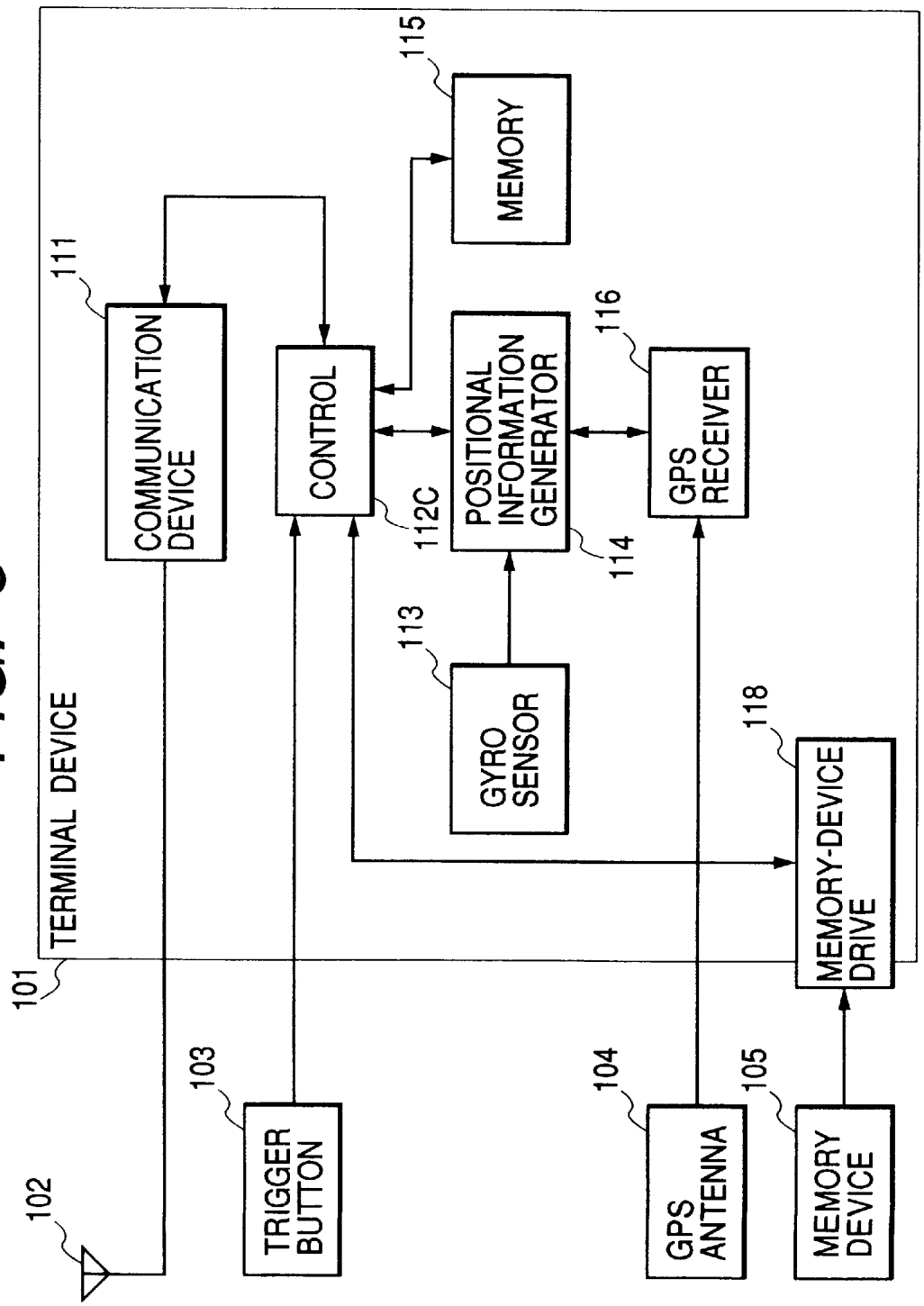
FIG. 8 is a block diagram of an emergency reporting apparatus according to a fifth embodiment of this invention.

FIG. 8 shows an emergency reporting apparatus (a terminal apparatus) according to a fifth embodiment of this invention. The emergency reporting apparatus in FIG. 8 is similar to that in FIG. 7 except for design changes mentioned hereinafter. The emergency reporting apparatus in FIG. 8 includes a controller 112C instead of the controller 112B (see FIG. 7).

The controller 112C implements a diagnosis process when a power supply of the emergency reporting apparatus is turned on. Alternatively, the controller 112C may periodically implement a diagnosis process.

During the diagnosis process, the controller 112C decides whether each of units 111, 113, 114, 115, 116, and 118 within a terminal device 101 is normal or abnormal. In the case where an abnormal unit is detected, the controller 112C generates abnormality information. Specifically, the abnormality information contains data representing the date and time of detection of the abnormal unit, data representing the name of the abnormal unit, and data representing the contents of the abnormality. The controller 112C outputs the abnormality information to a memory-device drive 118 and actuates the memory-device drive 118 to record the abnormality information on an external memory device 105.

Sixth Embodiment

Figure 9:
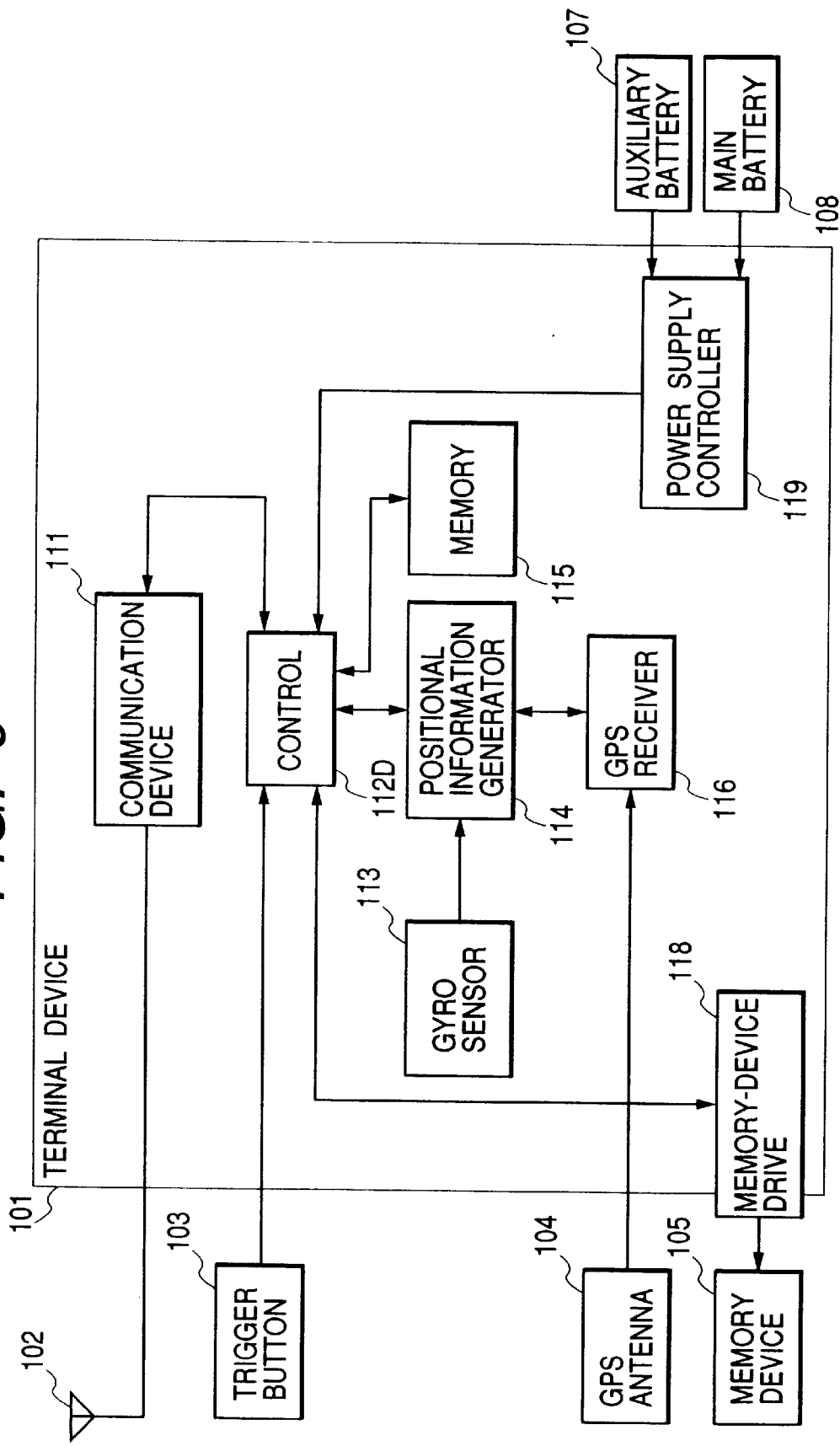
FIG. 9 is a block diagram of an emergency reporting apparatus according to a sixth embodiment of this invention.

FIG. 9 shows an emergency reporting apparatus (a terminal apparatus) according to a sixth embodiment of this invention. The emergency reporting apparatus in FIG. 9 is similar to that in FIG. 7 except for design changes mentioned hereinafter. The emergency reporting apparatus in FIG. 9 includes a controller 112D instead of the controller 112B (see FIG. 7). The emergency reporting apparatus in FIG. 9 includes a power supply controller 119 within a terminal device 101. The power supply controller 119 is connected with the controller 112D, an auxiliary battery 107, and a main battery 108.

Normally, the power supply controller 119 feeds power from the main battery 108 to units 111, 112D, 113, 114, 115, 116, and 118 within the terminal device 101. The power supply controller 119 includes a first section for detecting the voltage of power from the main battery 108, and a second section for comparing the detected voltage of power from the main battery 108 with a predetermined reference level, that is, a minimum necessary level. When the voltage of power from the main battery 108 drops below the minimum necessary level, the power supply controller 119 replaces the main battery 108 with the auxiliary battery 107 and uses the auxiliary battery 107 as a power source for the units 111, 112D, 113, 114, 115, 116, and 118. At the same time, the power supply controller 119 informs the controller 112D that the main battery 108 is replaced by the auxiliary battery 107.

The controller 112D generates power-supply history information which contains data representing the main battery 108 is replaced by the auxiliary battery 107, data representing a time during which the auxiliary battery 107 is used, data representing a total time during which the auxiliary battery 107 has been used, data representing a number of times of use of the auxiliary battery 107, and data representing the voltage of power from the auxiliary battery 107.

The controller 112C outputs the power-supply history information to a memory-device drive 118 and actuates the memory-device drive 118 to record the power-supply history information on an external memory device 105.

Seventh Embodiment

Figure 10:
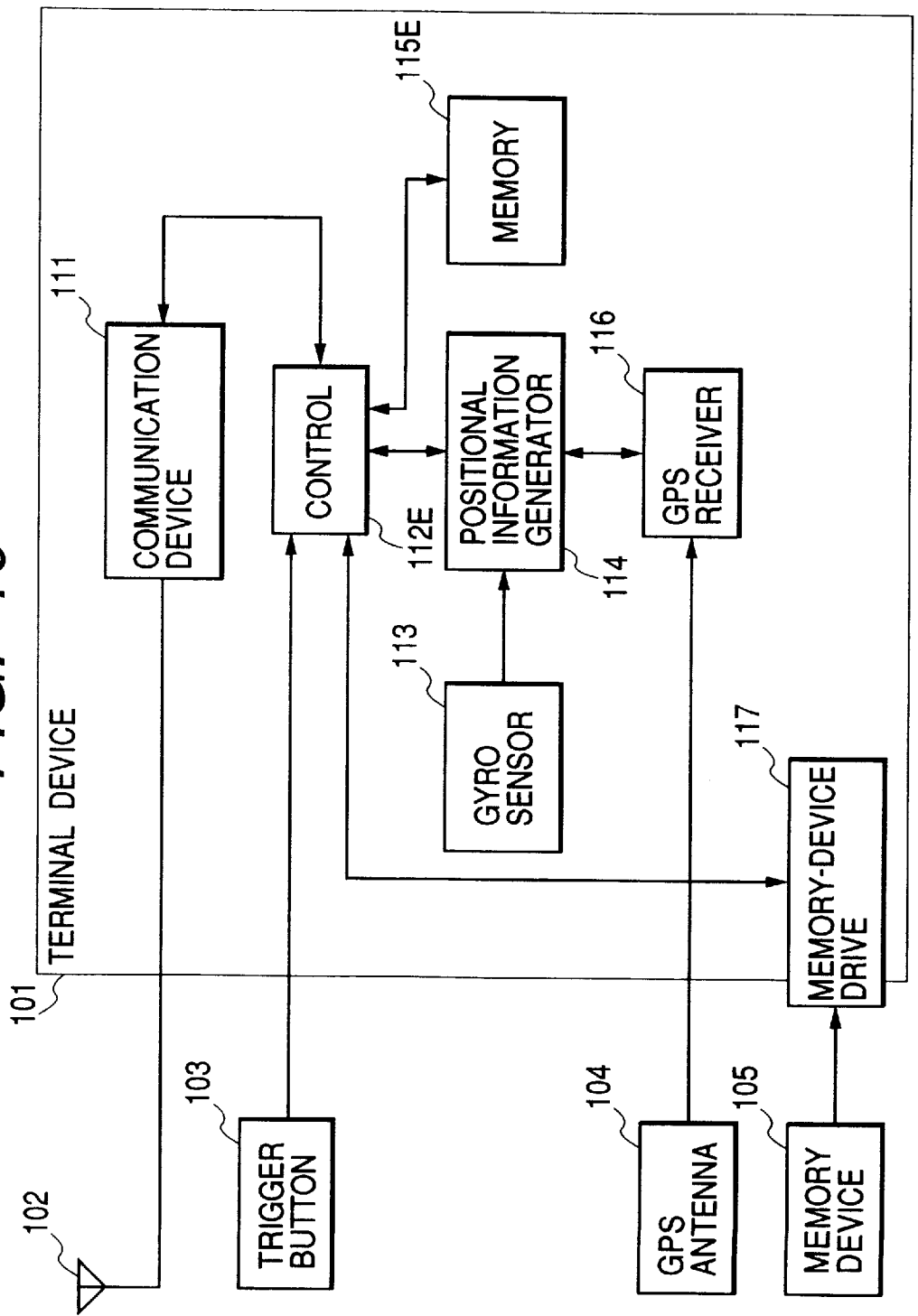
FIG. 10 is a block diagram of an emergency reporting apparatus according to a seventh embodiment of this invention.

FIG. 10 shows an emergency reporting apparatus (a terminal apparatus) according to a seventh embodiment of this invention. The emergency reporting apparatus in FIG. 10 is similar to that in FIG. 4 except for design changes mentioned hereinafter. The emergency reporting apparatus in FIG. 10 includes a controller 112E and a memory 115E which replace the controller 112 and the memory 115 (see FIG. 4) respectively. The memory 115E stores default data containing data representing a telephone number of an emergency report receiving center.

During an emergency reporting process, the controller 112E actuates a memory-device drive 117 to read out information from an external memory device 105. The controller 112E receives the read-out information from the memory-device drive 117.

In the case where the controller 112E fails to receive the read-out information from the memory-device drive 117, the controller 112E reads out the default data from the memory 115E. The controller 112E outputs the default data to a communication device 111. The default data are used as substitute data for the information in the external memory device 105. Specifically, the communication device 111 uses the default data as data to be transmitted to an emergency report receiving center, and also as data representing a telephone number of an emergency report receiving center.

In the case where the controller 112E detects that the read-out information from the memory-device drive 117 has a defect, the controller 112E reads out the default data from the memory 115E. The controller 112E makes up for the defect in the read-out information on the basis of the default data. Thus, the controller 112E corrects the read-out information into substantially complete information. The controller 112E outputs the substantially complete information to the communication device 111. The communication device 111 uses the substantially complete information as data to be transmitted to an emergency report receiving center, and also as data representing a telephone number of an emergency report receiving center. Alternatively, the controller 112E may set the defect in the read-out information as undefined data. In this case, the controller 112E uses the undefined data in generating data to be transmitted to an emergency report receiving center. Then, the controller 112E outputs the transmitted data to the communication device 111. Accordingly, in this case, the data containing the undefined data are transmitted to the emergency report receiving center.

Eighth Embodiment

Figure 11:
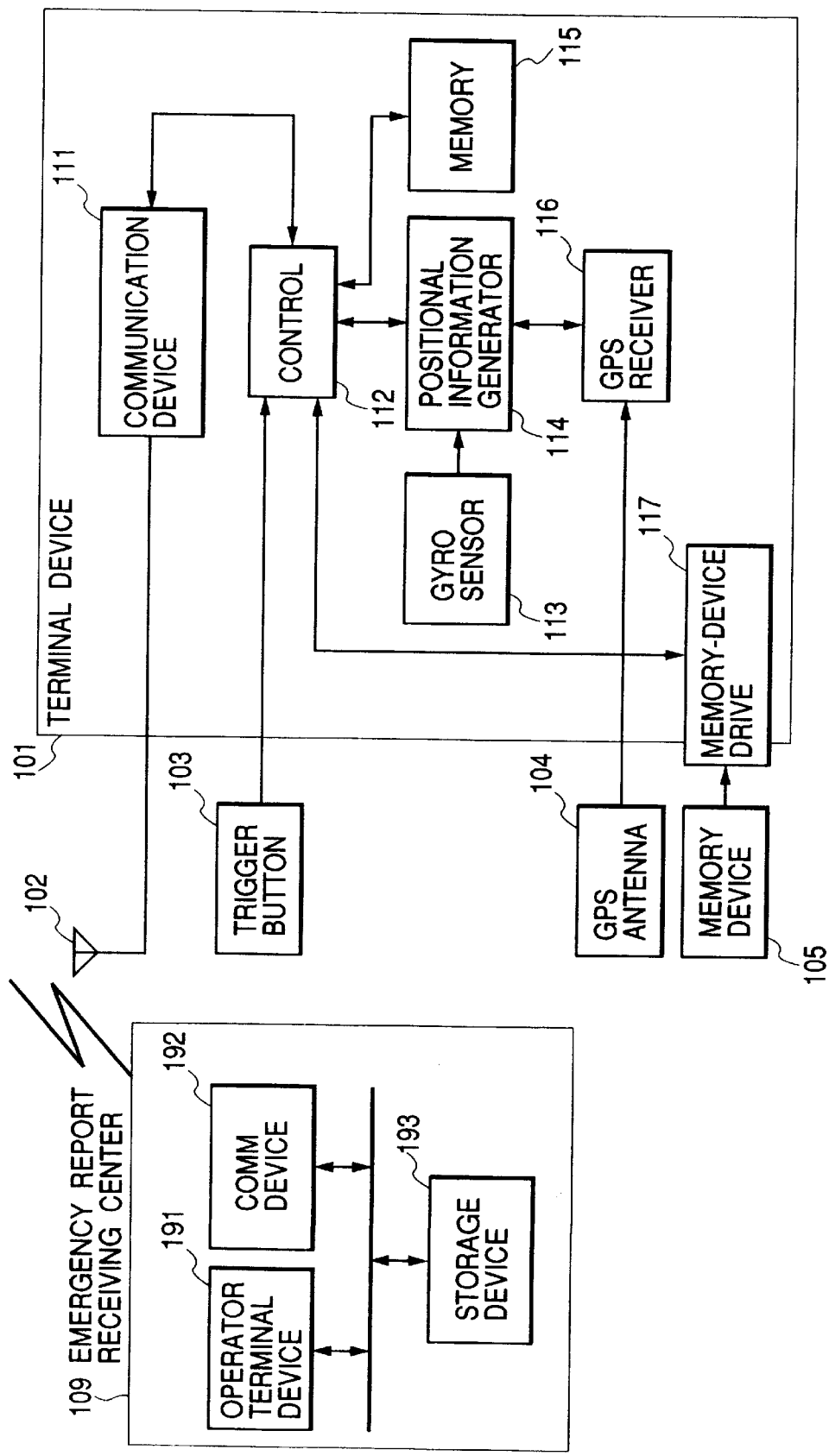
FIG. 11 is a block diagram of a portion of an emergency reporting network system according to an eighth embodiment of this invention.

FIG. 11 shows an eighth embodiment of this invention. The embodiment in FIG. 11 is similar to the embodiment in FIG. 4 except for design changes mentioned hereinafter.

As shown in FIG. 11, an emergency report receiving center 109 has an operator terminal device 191, a communication device 192, and a storage unit 193 connected to each other. The operator terminal device 191 includes a computer-based circuit for controlling the whole of the emergency report receiving center 109. The operator terminal device 191 also includes a display. The communication device 192 in the emergency report receiving center 109 is designed to implement data communication with emergency reporting apparatuses (terminal apparatuses) within vehicles. The storage unit 193 is loaded with information forming a customer database. The storage unit 193 includes, for example, a hard disk device. The information in the storage unit 193 contains information of customers (users of terminal devices in emergency reporting apparatuses) and information of customer's vehicles. Specifically, a portion of the information in the storage unit 193 represents a list of the registration numbers (the identification numbers) of legitimate customers or legitimate users of terminal devices in emergency reporting apparatuses.

With reference to FIG. 11, during an emergency reporting process, a terminal device 101 in an emergency reporting apparatus transmits positional information data and additional information data to the emergency report receiving center 109. A portion of the additional information represents the registration number (the identification number) of the user of the terminal device 101. The communication device 192 in the emergency report receiving center 109 receives the positional information data and the additional information data. The communication device 192 outputs the positional information data and the additional information data to the operator terminal device 191. The operator terminal device 191 extracts data of the registration number of the user (the user's registration number in question) from the additional information data. The operator terminal device 191 accesses the storage unit 193, and collates the user's registration number in question with the list of the registration numbers of the legitimate users.

When the user's registration number in question agrees with one of the registration numbers of the legitimate users, the operator terminal device 191 controls the communication device 192 to advance the emergency reporting process. On the other hand, when the user's registration number in question agrees with none of the registration numbers of the legitimate users, the operator terminal device 191 controls the communication device 192 to return a signal to the terminal device 101 which represents a refusal to receive the present emergency report. The operator terminal device 191 may indicate the refusal to receive the present emergency report.

Ninth Embodiment

Figure 12:
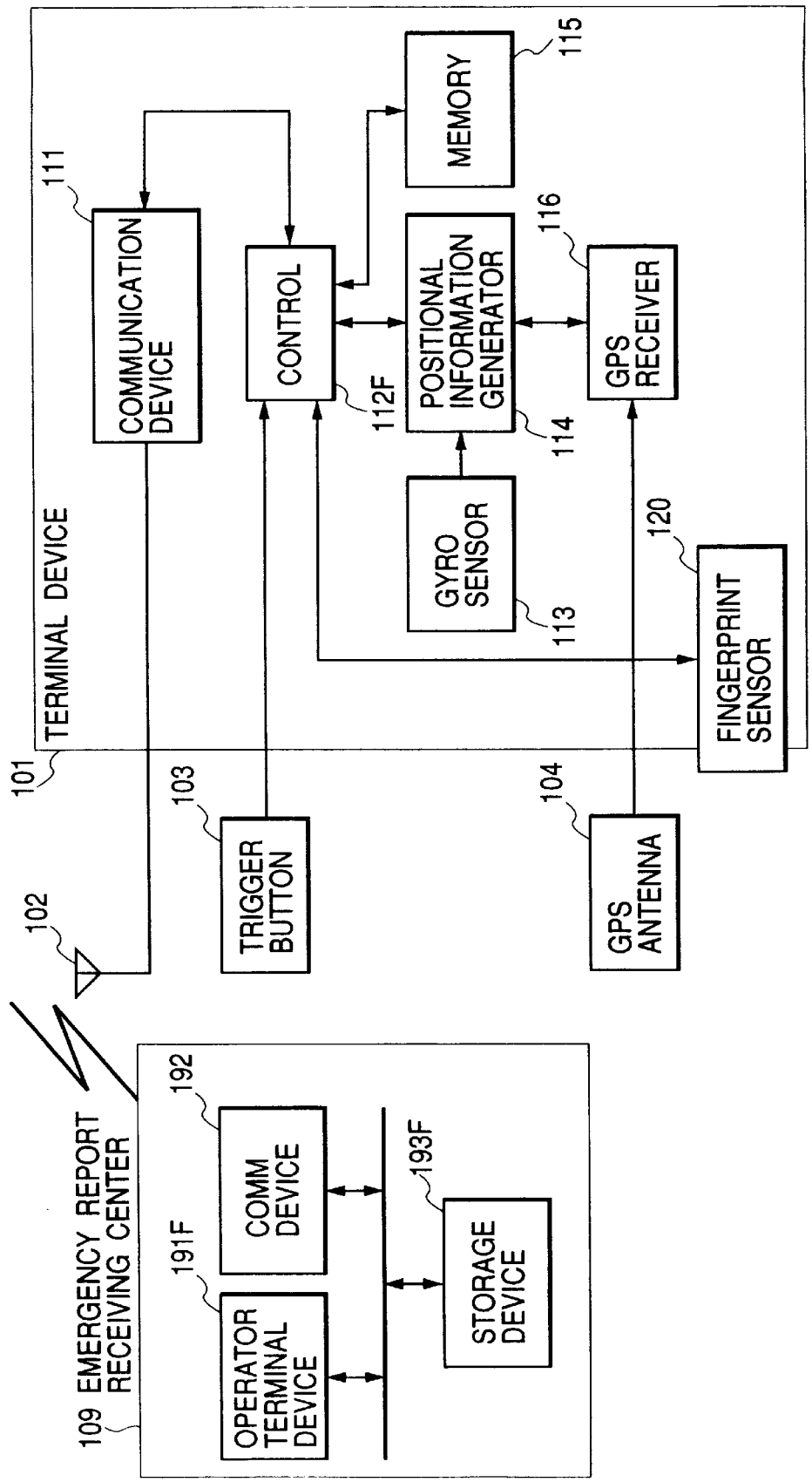
FIG. 12 is a block diagram of a portion of an emergency reporting network system according to a ninth embodiment of this invention.

FIG. 12 shows a ninth embodiment of this invention. The embodiment in FIG. 12 is similar to the embodiment in FIG. 11 except for design changes mentioned hereinafter.

As shown in FIG. 12, a terminal device 101 in an emergency reporting apparatus includes a controller 112F instead of a controller 112 (see FIG. 11). In addition, the terminal device 101 includes a fingerprint sensor 120 connected to the controller 112F. An emergency report receiving center 109 includes an operator terminal device 191F and a storage unit 193F which replace the operator terminal device 191 and the storage unit 193 respectively.

The storage unit 193F in the emergency report receiving center 109 is loaded with information representing a list of the fingerprints of legitimate customers or legitimate users of terminal devices in emergency reporting apparatuses.

Regarding the emergency reporting apparatus having the terminal device 101, when a vehicle accessary power supply is turned on, a user is required to contact user's finger with the fingerprint sensor 120. Upon the contact of the user's finger with the fingerprint sensor 120, the fingerprint of the user is detected thereby. The fingerprint sensor 120 outputs data representative of the detected user's fingerprint to the controller 112F. The controller 112F stores the data of the user's fingerprint into a memory 115.

During an emergency reporting process, the controller 112F in the terminal device 101 reads out the data of the user's fingerprint from the memory 115. The controller 112F adds the data of the user's fingerprint to additional information data. The controller 112F outputs the resultant additional information data to a communication device 111. Accordingly, the terminal device 101 in the emergency reporting apparatus transmits positional information data and also the additional information data to the emergency report receiving center 109. A communication device 192 in the emergency report receiving center 109 receives the positional information data and the additional information data. The communication device 192 outputs the positional information data and the additional information data to the operator terminal device 191F. The operator terminal device 191F extracts the data of the user's fingerprint in question from the additional information data. The operator terminal device 191F accesses the storage unit 193F, and collates the user's fingerprint in question with the list of the fingerprints of the legitimate users.

When the user's fingerprint in question agrees with one of the fingerprints of the legitimate users, the operator terminal device 191F controls the communication device 192 to advance the emergency reporting process. On the other hand, when the user's fingerprint in question agrees with none of the fingerprints of the legitimate users, the operator terminal device 191F controls the communication device 192 to return a signal to the terminal device 101 which represents a refusal to receive the present emergency report. The operator terminal device 191F may indicate the refusal to receive the present emergency report.

What is claimed is:

1. An emergency reporting apparatus for a vehicle, comprising:
   a detachable external memory device storing data related to an emergency report;
   first means for reading out the data from the detachable external memory device:
   second means for reporting an emergency to an emergency report receiving center in response to the data read out by the first means;
   a main battery;
   an auxiliary battery;
   third means for detecting whether or not a voltage of the main battery drops below a reference level;
   fourth means for replacing the main battery with the auxiliary battery when the third means detects that the voltage of the main battery drops below the reference level; and
   fifth means for recording information of replacement of the main battery with the auxiliary battery on the detachable external memory device.

2. An emergency reporting apparatus as recited in claim 1, further comprising sixth means for, in cases where the first means fails to read out the data from the detachable external memory device, informing a user of the failure.

3. An emergency reporting apparatus as recited in claim 1, further comprising sixth means for recording information of a history of an emergency report and a history of an abnormality of an emergency report on the detachable external memory device.

4. An emergency reporting apparatus as recited in claim 1, further comprising sixth means for detecting an abnormality, and seventh means for, when the sixth means detects an abnormality, recording information of the abnormality detected by the sixth means on the detachable external memory device.

5. An emergency reporting apparatus as recited in claim 1, further comprising sixth means for, in cases where the first means fails to read out the data from the detachable external memory device, generating substitute data, and seventh means for reporting an emergency to the emergency report receiving center in response to the substitute data generated by the sixth means.

6. An emergency reporting apparatus as recited in claim 1, further comprising sixth means for transmitting the data, which is read out from the detachable external memory device by the first means, to the emergency report receiving center when the second means reports an emergency to the emergency report receiving center.

7. An emergency reporting apparatus as recited in claim 1, further comprising sixth means for transmitting the data, which is read out from the detachable external memory device by the first means, to the emergency report receiving center when the second means reports an emergency to the emergency report receiving center, wherein the data transmitted to the emergency report receiving center by the sixth means contains information related to a vehicle passenger.

8. An emergency reporting apparatus as recited in claim 1, further comprising a sensor for sensing a fingerprint and generating data representing the sensed fingerprint, and sixth means for transmitting the data of the fingerprint, which is generated by the sensor, to the emergency report receiving center when the second means reports an emergency to the emergency report receiving center.

* * * * *